(12) United States Patent
Yokomizo

(10) Patent No.: US 12,532,064 B2
(45) Date of Patent: Jan. 20, 2026

(54) IMAGE CAPTURING APPARATUS, CONTROL METHOD OF IMAGE CAPTURING APPARATUS, PROGRAM RECORDING MEDIUM, AND IMAGE CAPTURING SYSTEM

(71) Applicant: CANON KABUSHIKI KAISHA, Tokyo (JP)

(72) Inventor: Tsuyoshi Yokomizo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 18/788,844

(22) Filed: Jul. 30, 2024

(65) Prior Publication Data
US 2025/0080832 A1 Mar. 6, 2025

(30) Foreign Application Priority Data
Aug. 30, 2023 (JP) .................. 2023-140290

(51) Int. Cl.
*H04N 23/63* (2023.01)
*H04N 23/60* (2023.01)

(52) U.S. Cl.
CPC ......... *H04N 23/632* (2023.01); *H04N 23/634* (2023.01); *H04N 23/64* (2023.01)

(58) Field of Classification Search
CPC ..... H04N 23/632; H04N 23/64; H04N 23/634

USPC .................................................. 348/333.02
See application file for complete search history.

(56) References Cited

U.S. PATENT DOCUMENTS
10,277,836 B2 * 4/2019 Mitsui ................. G06V 10/25

FOREIGN PATENT DOCUMENTS
| JP | 2008022260 A | 1/2008 |
| JP | 2016127499 A | 7/2016 |
| JP | 2020202481 A | 12/2020 |
| JP | 2022070601 A | 5/2022 |

* cited by examiner

*Primary Examiner* — Joel W Fosselman
(74) *Attorney, Agent, or Firm* — Cowan, Liebowitz & Latman, P.C.

(57) ABSTRACT

An image capturing apparatus capable of providing notification about a change of a thumbnail image at an appropriate timing provides notification about the first information to an information processing apparatus external to the image capturing apparatus in response to a change in the first information generated by the image capturing apparatus, registers information indicating an image capturing direction of the image capturing apparatus, generates a thumbnail image based on a captured image captured by an image capturing unit included in the image capturing apparatus in the registered image capturing direction, generates identification information that uniquely identifies the generated thumbnail image, and provides a notification about the generated identification information as the first information to the information processing apparatus.

17 Claims, 7 Drawing Sheets

IMAGE CAPTURING APPARATUS, CONTROL METHOD OF IMAGE CAPTURING APPARATUS, PROGRAM RECORDING MEDIUM, AND IMAGE CAPTURING SYSTEM

BACKGROUND OF THE INVENTION

Field of the Invention

The present invention relates to an image capturing apparatus, a control method of the image capturing apparatus, a program recording medium, and an image capturing system.

DESCRIPTION OF THE RELATED ART

In recent years, image distribution systems via a network have been increasing. Such a distribution system is employed in, for example, an Internet site that distributes a situation of a ski resort or a zoo. Additionally, such a distribution system is also employed in monitoring of a store or a building. Furthermore, in the field of video production, video distribution and camera control via a network are used. As the network, an Internet Protocol (IP) network, for example, the Internet is used. As a specific example, a mechanism, for example, WebView or XC protocol is known.

In such a system, the image capturing apparatus can provide a notification about information (camera information) indicating the current state of an image capturing apparatus to a client, in response to a request from the client. For example, Japanese Patent Application Laid-Open No. 2016-127499 discloses that when the image capturing apparatus receives a request for information indicating an image capturing direction from a client, the image capturing apparatus transmits this information to the client. Additionally, Japanese Patent Application Laid-Open No. 2022-70601 discloses that image capturing information including an image capturing direction is transmitted to a client device at a set interval.

In addition, there is also known a preset function of registering a position of a video imaged by an image capturing apparatus in advance. Furthermore, there is known a function of generating a thumbnail image obtained by reducing (resizing) a captured image at a preset position and associating the thumbnail image with a preset during preset registration. For example, Japanese Patent Application Laid-Open No. 2008-22260 discloses a monitoring system consisting of a camera, a management server, and an operation terminal, in which the management server periodically acquires videos at a preset position from the camera and updates thumbnail images of the videos at the pre-set position.

Here, there is a case where when the thumbnail image at the pre-set position is generated, the client is notified about the information as camera information. At this time, in a case where the thumbnail image is rewritten by overwrite and save, it is not possible to notify that the thumbnail image is changed only by notifying information indicating whether or not the thumbnail image is stored. Therefore, there is a drawback in which a client waiting for the change notification cannot acquire the thumbnail image from the camera again.

In addition, order to handle this drawback, it is also possible to confirm whether or not a thumbnail image has been periodically updated to the image capturing apparatus from a client that displays thumbnails for each preset, and to acquire the thumbnail image from the image capturing apparatus when it is found that the thumbnail image has been updated. However, in the case of this handling, there is a drawback in which, if the interval of confirming whether or not the thumbnail image has been updated is long, the update of the thumbnail display on the client is delayed immediately after the update. If the interval of confirming whether or not the thumbnail image has been updated is short, in particular, if the number of clients connected to the image capturing apparatus increases, a drawback occurs in which the processing load of the image capturing apparatus, for example, a network load and a CPU load of the image capturing apparatus increases.

SUMMARY OF THE INVENTION

The present invention has been made in view of the above drawbacks, and an object of the present invention is providing an image capturing apparatus capable of providing notification about a change in a thumbnail image at an appropriate timing.

The image capturing apparatus as an aspect of the present invention is an image capturing apparatus comprising: providing notification about first information to an information processing apparatus external to the image capturing apparatus, in response to a change in the first information generated by the image capturing apparatus; registering information indicating an image capturing direction of the image capturing apparatus; generating a thumbnail image based on a captured image captured by an image capturing unit included in the image capturing apparatus in the registered image capturing direction; generating identification information that uniquely identifies the generated thumbnail image; and providing a notification about the generated identification information as the first information to the information processing apparatus.

Further features of the present invention will become apparent from the following description of exemplary embodiments with reference to the attached drawings.

DESCRIPTION OF THE EMBODIMENTS

Figure 1:
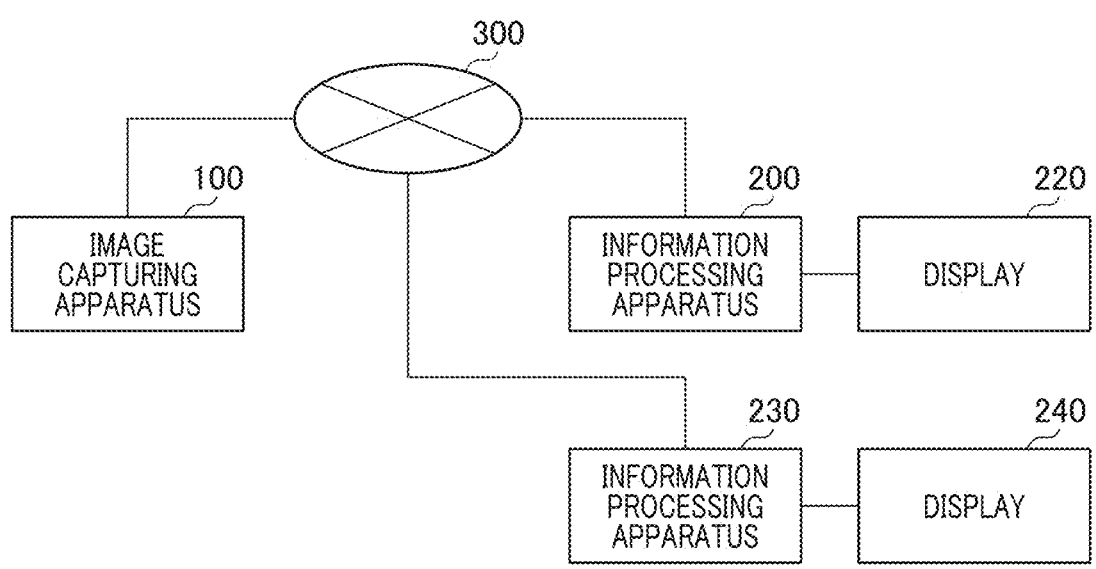
FIG. 1 is a diagram illustrating an example of a configuration of an image capturing system according to the embodiment.

Hereinafter, an embodiment will be explained in detail with reference to the accompanying drawings. Note that the embodiment below is not intended to limit the claimed invention. Although a plurality of features is described in the embodiment, all of the plurality of features are not necessarily mandatory to the invention, and the plurality of features may be arbitrarily combined. Furthermore, in the accompanying drawings, the same or similar components are denoted by the same reference numerals, and redundant description will be omitted.

First Embodiment

FIG. 1 illustrates a configuration example of an image capturing system according to the present embodiment. The image capturing system according to the present embodiment is configured by having an image capturing apparatus 100, an information processing apparatus 200, and an information processing apparatus 230. The image capturing apparatus 100, the information processing apparatus 200, and the information processing apparatus 230 are connected to each other via a network 300. The configuration of the network 300 is not particularly limited. Note that an image capturing system may be configured by the image capturing apparatus 100 and the information processing apparatus 200, or the image capturing system may be configured by the image capturing apparatus 100 and the information processing apparatus 230. That is, the image capturing system of the present embodiment can be configured by the image capturing apparatus 100 and at least one information processing apparatus.

The network 300 may be configured by a plurality of routers, switches, and cables conforming to a communication standard, for example, ETHERNET (registered trademark). Additionally, the network 300 may be the Internet, a wired local area network (LAN), a wireless LAN, or a wide area network (WAN).

The image capturing apparatus 100 is an apparatus that performs image capture to generate a captured image. The image capturing direction of the image capturing apparatus 100 may be controllable. The image capturing apparatus 100 can transmit data of a captured image to an external apparatus, for example, the information processing apparatus 200 and the information processing apparatus 230, via the network 300. The image capturing apparatus 100 may further transmit metadata of the captured image (for example, information on the date and time when the image was captured) or identification information for identifying the image capturing apparatus 100 to an external apparatus, for example, the information processing apparatus 200 and the information processing apparatus 230 in association with the captured image. Additionally, in the present embodiment, the image capturing apparatus 100 can transmit camera information (first information) of the image capturing apparatus 100 to an external apparatus, for example, the information processing apparatus 200 and the information processing apparatus 230.

In the present specification, the camera information is information indicating a current state of the image capturing apparatus 100 (for example, a state of an image capturing position), control information affecting an image captured by the image capturing apparatus 100, and information on various setting values held by the image capturing apparatus 100.

The information processing apparatus 200 and the information processing apparatus 230 are, for example, client apparatuses, for example, personal computers (PCs). The image capturing system according to the present embodiment has one image capturing apparatus 100. Note that the image capturing system according to the present embodiment may have a plurality of image capturing apparatuses 100. That is, a plurality of image capturing apparatuses 100 may be connected to the information processing apparatus 200 and the information processing apparatus 230 via the network 300. In this case, the information processing apparatus 200 and the information processing apparatus 230 can determine which image capturing apparatus 100 of the plurality of image capturing apparatuses 100 has imaged the captured image, for example, using the identification information associated with the transmitted captured image. A program for realizing a function of processing to be described below can be installed in the information processing apparatus 200 and the information processing apparatus 230.

A display 220 (display device) is connected to the information processing apparatus 200. Additionally, a display 240 (display device) is connected to the information processing apparatus 230. The display 220 and the display 240 can display a captured image, a thumbnail image, and the like that have been transmitted from the image capturing apparatus 100. The display 220 and the display 240 are, for example, liquid crystal displays (LCDs). The display 220 and the display 240 may be connected to the information processing apparatus 200 via a display cable conforming to a communication standard, for example, High Definition Multimedia Interface (HDMI (registered trademark)). Note that the display 220 and the information processing apparatus 200, or the display 240 and the information processing apparatus 230 may be provided in a single housing.

Figure 2:
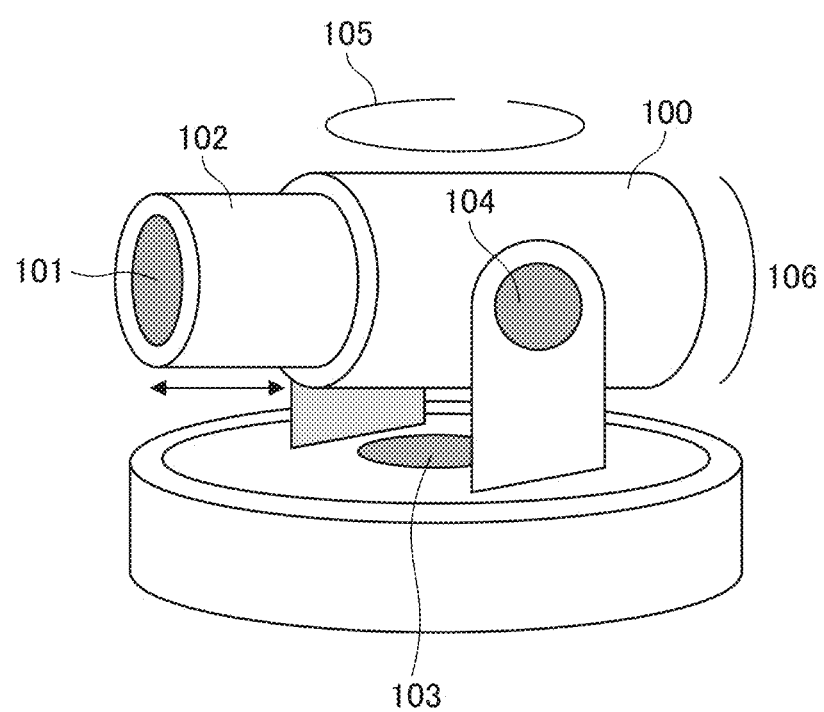
FIG. 2 is a diagram illustrating an example of the appearance of an image capturing apparatus according to the embodiment.
Figure 3:
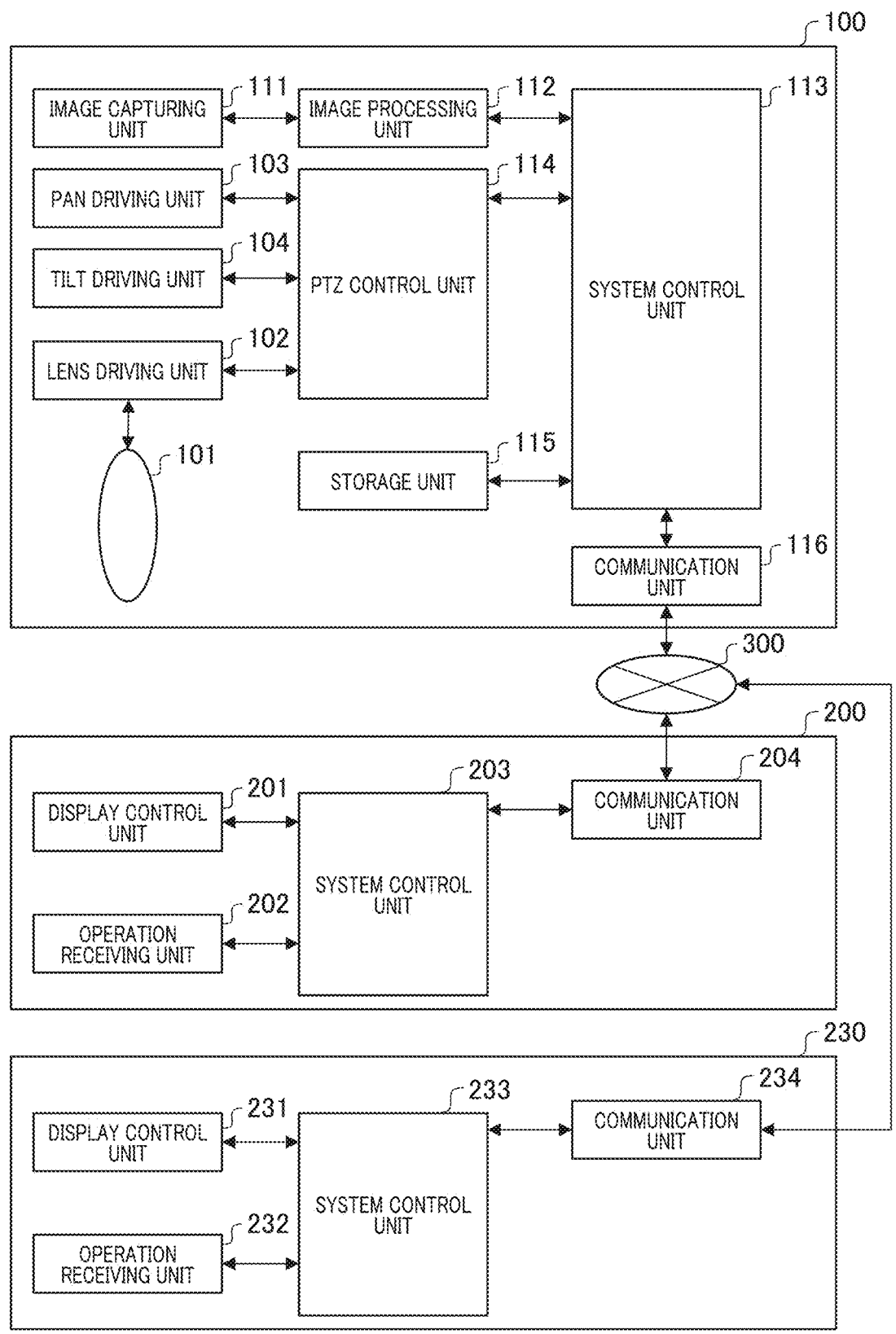
FIG. 3 is a diagram illustrating an example of a functional configuration of the image capturing apparatus and an information processing apparatus according to the embodiment.

Next, the image capturing apparatus 100 according to the present embodiment will be explained with reference to FIG. 2 and FIG. 3. FIG. 2 is a diagram illustrating an example of an external view of the image capturing apparatus 100 according to the present embodiment. FIG. 3 is a diagram illustrating an example of a functional configuration of the image capturing apparatus 100 and the information processing apparatus 200 according to the present embodiment.

The image capturing direction of the image capturing apparatus 100 is a direction in which the optical axis of a lens 101 is directed. The light flux that has passed through the lens 101 forms an image on the image sensor of an image capturing unit 111. A lens driving unit 102 is a driving system that drives the lens 101. Additionally, the lens driving unit 102 can change a focus length of the lens 101. The lens driving unit 102 is controlled by a pan/tilt/zoom (PTZ) control unit 114.

A pan driving unit 103 rotationally drives the image capturing direction of the image capturing apparatus 100 in a pan direction (horizontal direction) 105. The pan driving unit 103 has a mechanical driving system for performing a pan operation for rotating the image capturing direction of the image capturing apparatus 100 in the pan direction, and a driving source such as a motor. The pan driving unit 103 is controlled by the PTZ control unit 114.

A tilt driving unit 104 rotationally drives the image capturing direction of the image capturing apparatus 100 in a tilt direction (vertical direction) 106. The tilt driving unit 104 has a mechanical driving system that performs a tilt operation for rotating the image capturing direction of the image capturing apparatus 100 in a tilt direction, and a driving source such as a motor. The tilt driving unit 104 is controlled by the PTZ control unit 114.

The image capturing unit 111 performs image capturing (shooting) to generate a captured image. The image capturing unit 111 has an image sensor (not illustrated). The image sensor is, for example, a charge coupled device (CCD) sensor, a complementary metal oxide semiconductor (CMOS) sensor, and the like. The image capturing unit 111 generates an electric signal by photoelectrically converting an object image that has been formed through the lens 101.

An image processing unit 112 generates image data based on an electrical signal obtained from the image capturing unit 111. The image processing unit 112 can convert the electric signal obtained by the image capturing unit 111 into a digital signal. Additionally, the image processing unit 112 can perform image processing such as compression coding processing on a digital signal indicating an image.

The PTZ control unit 114 controls the pan driving unit 103, the tilt driving unit 104, and the lens driving unit 102 based on an instruction from a system control unit 113. Accordingly, the PTZ control unit 114 in the present embodiment can control the image capturing condition of the image capturing apparatus 100. For example, the PTZ control unit 114 can control an image capturing direction, a zoom value (angle of view), or a focus of the image capturing apparatus 100. The image captured by the image capturing apparatus 100 is affected by such control of the PTZ control unit 114.

A storage unit 115 stores (holds) various kinds of information such as camera information and preset information of the image capturing apparatus 100. A communication unit 116 performs communication with the information processing apparatus 200. The communication unit 116 may perform communication through an I/F 440, which will be described below with reference to FIG. 4. For example, the communication unit 116 can transmit data of an image captured by the image capturing apparatus 100 to the information processing apparatus 200 via the network 300. Additionally, the communication unit 116 can transmit control information of the image capturing apparatus 100 to the information processing apparatus 200. Furthermore, the communication unit 116 can receive a control request, which is a command for controlling the image capturing apparatus 100, from the information processing apparatus 200. The communication unit 116 may transmit the received control request to the system control unit 113.

An example of a communication protocol used by the communication unit 116 to communicate with an external device, for example, the information processing apparatus 200 via the network 300 is Hypertext Transfer Protocol (HTTP). The version of HTTP is not specifically limited. For example, HTTP/1.0, HTTP/1.1, HTTP/2, and HTTP/3 may be used. Additionally, communication via a transport layer security (TLS) layer can be performed.

In a case where the communication unit 116 receives an information acquisition request from the information processing apparatus 200, the communication unit 116 may adjust the timing of returning a response so that the network bandwidth is effectively used. For example, in a case where the information to be transmitted to the information processing apparatus 200 has not been changed from the previously transmitted information, the communication unit 116 may suspend the response. In this case, the communication unit 116 may return a response in a case where the information is changed. For this purpose, multipart or Transfer-encoding: chunked in HTTP/1.1 may be used. Alternatively, DATAFRAME and PUSH_PROMISE in HTTP/2 may be used.

In the present embodiment, the system control unit 113 provides a notification about (transmits) the camera information of the image capturing apparatus 100 to another external apparatus, for example, the information processing apparatus 200 and the information processing apparatus 230 via the communication unit 116. As will be explained below with reference to FIG. 5, the communication unit 116 of the present embodiment can provide a notification about the camera information to another external apparatus, for example, the information processing apparatus 200 and the information processing apparatus 230, in response to a change in the camera information, according to the control of the system control unit 113.

The system control unit 113 can control the entire image capturing apparatus 100. For example, the system control unit 113 can perform the processing below. The system control unit 113 analyzes the control request for controlling the image capturing apparatus 100 that has been transmitted from the communication unit 116. The system control unit 113 then performs the processing in response to such a control request. Additionally, the system control unit 113 instructs the PTZ control unit 114 to perform a pan/tilt/zoom operation.

Additionally, the system control unit 113 causes the communication unit 116 to transmit the image data generated by the image processing unit 112 to the information processing apparatus 200. At this time, the system control unit 113 can assign metadata (for example, information on image capturing time) to the image data.

Note that the image capturing direction of the image capturing apparatus 100 in the present embodiment is determined by at least one of a pan value and a tilt value of the image capturing apparatus 100. In the present embodiment, the pan value indicates an angle of the image capturing direction (optical axis) of the image capturing apparatus 100 in the pan direction 105. This angle is set such that the angle at one of the ends of the driving range of the pan driving unit 103 is 0°. Additionally, the tilt value indicates an angle of the image capturing direction (optical axis) of the image capturing apparatus 100 in the tilt direction 106. This angle is set such that the angle at one of the ends of the driving range of the tilt driving unit 104 is 0°. Additionally, a zoom value of the image capturing apparatus 100 when an image is captured by the image capturing apparatus 100 is calculated based on a focus length of the lens 101.

Furthermore, the information processing apparatus 200 and the information processing apparatus 230 according to the present embodiment will be explained with reference to FIG. 3. A display control unit 201 causes the display 220 to display an image. A display control unit 231 causes the display 240 to display an image. For example, the display control unit 201 can cause a display 220 to display a captured image imaged by the image capturing apparatus 100. Additionally, the display control unit 201 can cause the display 240 to display a captured image captured by the image capturing apparatus 100. Note that the system controller 113 of the image capturing apparatus 100 may perform the processing of causing the display 220 and the display 240 to display an image.

An operation receiving unit 202 and an operation receiving unit 232 function as an operation unit that receives an input based on a user operation via a input device (not illustrated), for example, a keyboard, a mouse, and a touch panel.

A communication unit 204 and a communication unit 234 can communicate with the image capturing apparatus 100 via the I/F 440, which will be described below with reference to FIG. 4. For example, the communication unit 204 can transmit a setting request or a control request of the image capturing apparatus 100 that has been transmitted from a system control unit 203 to the image capturing apparatus 100. Similarly, the communication unit 234 can transmit a setting request or a control request of the image capturing apparatus 100 that has been transmitted from a system control unit 233 to the image capturing apparatus 100.

Additionally, the communication unit 204 can receive image data that have been transmitted from the image capturing apparatus 100 or a response from the image capturing apparatus 100 to a request that has been transmitted from the information processing apparatus 200 to the image capturing apparatus 100. Similarly, the communication unit 234 can receive image data that have been transmitted from the image capturing apparatus 100 or a response from the image capturing apparatus 100 to a request that has been transmitted from the information processing apparatus 230 to the image capturing apparatus 100. The communication unit 204 can transmit data or a response received from the image capturing apparatus 100 to the system control unit 203. Similarly, the communication unit 234 can transmit data or a response that has been received from the image capturing apparatus 100 to the system control unit 233.

The system control unit 203 can control the entire information processing apparatus 200. Similarly, the system control unit 233 can control the entire information processing apparatus 230. For example, the system control unit 203 and the system control unit 233 can perform the processing below. The system control unit 203 and the system control unit 233 can generate a setting request or a control request of the image capturing apparatus 100.

The system control unit 203 can generate a request based on input from the user that has been received by the operation receiving unit 202. Similarly, the system control unit 233 can generate a request based on the input from the user that has been received by the operation receiving unit 232. The system control unit 203 and the system control unit 233 can generate, for example, a setting request and a control request.

Additionally, the system control unit 203 can transmit the generated request to the image capturing apparatus 100 via the communication unit 204. Similarly, the system control unit 233 can transmit the generated request to the image capturing apparatus 100 via the communication unit 234. Additionally, the system control unit 203 acquires a response to the transmitted setting request or the transmitted control request from the image capturing apparatus 100 via the communication unit 204. Similarly, the system control unit 233 acquires a response to the transmitted setting request or the transmitted control request from the image capturing apparatus 100 via the communication unit 234. Thus, the information processing apparatus 200 and the information processing apparatus 230 can perform the control of the image capturing apparatus 100 via the network 300.

Figure 4:
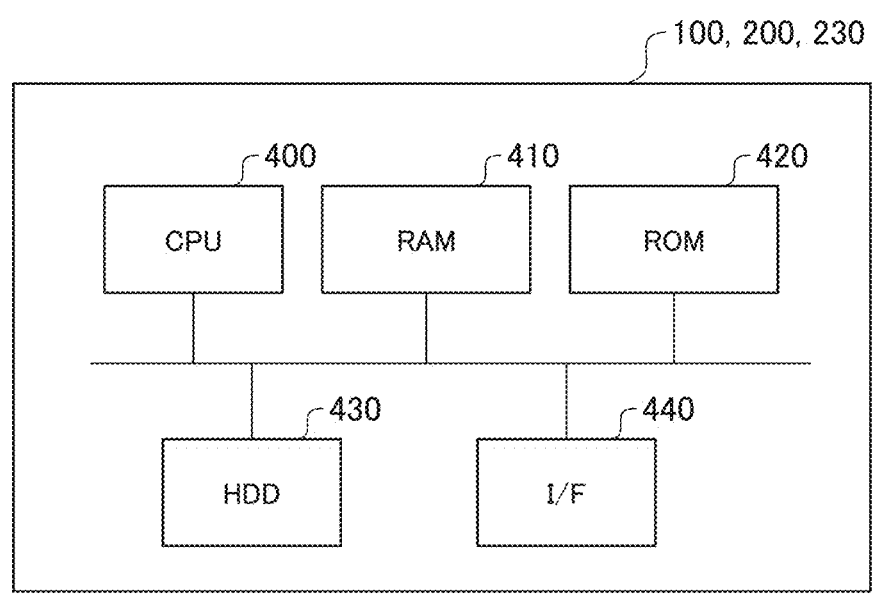
FIG. 4 is a diagram illustrating a hardware configuration of each device according to the embodiment.

FIG. 4 is a diagram illustrating an example of a hardware configuration that can be used for realizing the functions of the image capturing apparatus 100, the information processing apparatus 200, and the information processing apparatus 230. For example, the image capturing apparatus 100 may have a configuration as shown in FIG. 4, in addition to the configuration as shown in FIG. 3. At least a part of the functions of the image capturing apparatus 100 as shown in FIG. 3 can be realized by a processor, for example, a CPU 400 executing a program stored in a memory, for example, a RAM 410, a ROM 420, or an HDD 430. For example, the functions of the image processing unit 112, the system control unit 113, and the PTZ control unit 114 can be realized by the processing executed by the CPU 400. Note that the storage unit 115 can be realized, for example, by the RAM 410. Additionally, the communication unit 116 can be realized by, for example, the I/F 440.

Additionally, the information processing apparatus 200 and the information processing apparatus 230 can also have the configuration as shown in FIG. 4. In addition, at least a part of the functions of the information processing apparatus 200 and the information processing apparatus 230 as shown in FIG. 3 can be realized by a processor, for example, the CPU 400, executing a program stored in a memory, for example, the RAM 410, the ROM 420, or the HDD 430.

The central processing unit (CPU) 400 is a central processing unit that performs overall control of the image capturing apparatus 100. The random access memory (RAM) 410 can temporarily store a computer program executed by the CPU 400. Additionally, the RAM 410 provides a work area used when the CPU 400 executes the processing. Additionally, the RAM 410 can function as a frame memory or a buffer memory. Note that the number of the CPU 400 is not limited to one, and a plurality of CPUs 400 may be provided.

The read only memory (ROM) 420 stores a program used by the CPU 400 to control the image capturing apparatus 100. Note that the number of memories, for example, the RAM 410 and the ROM 420, is not limited to one as in the case of the CPU 400, and a plurality of memories may be provided. The HDD 430 is a storage unit (secondary storage unit) that records image date and the like. The I/F 440 performs communication with an external device via the network 300. The I/F 440 can perform communication in accordance with TCP/IP and HTTP.

Note that at least a part of the functions of the image capturing apparatus 100, the information processing apparatus 200, and the information processing apparatus 230 may be realized by dedicated hardware. For example, processing for displaying a graphical user interface (GUI) or image data on the display 220 or the display 240 may be performed by a graphics processing unit (GPU). Additionally, the processing of reading out the program code from the ROM 420 and deploying the program code into the RAM 410 may be performed by direct memory access (DMA) that functions as a transfer device.

The flow of processes from when the information processing apparatus issues a preset registration request to when a thumbnail is displayed will be explained below with reference to FIG. 5 and FIG. 6.

Figure 5:
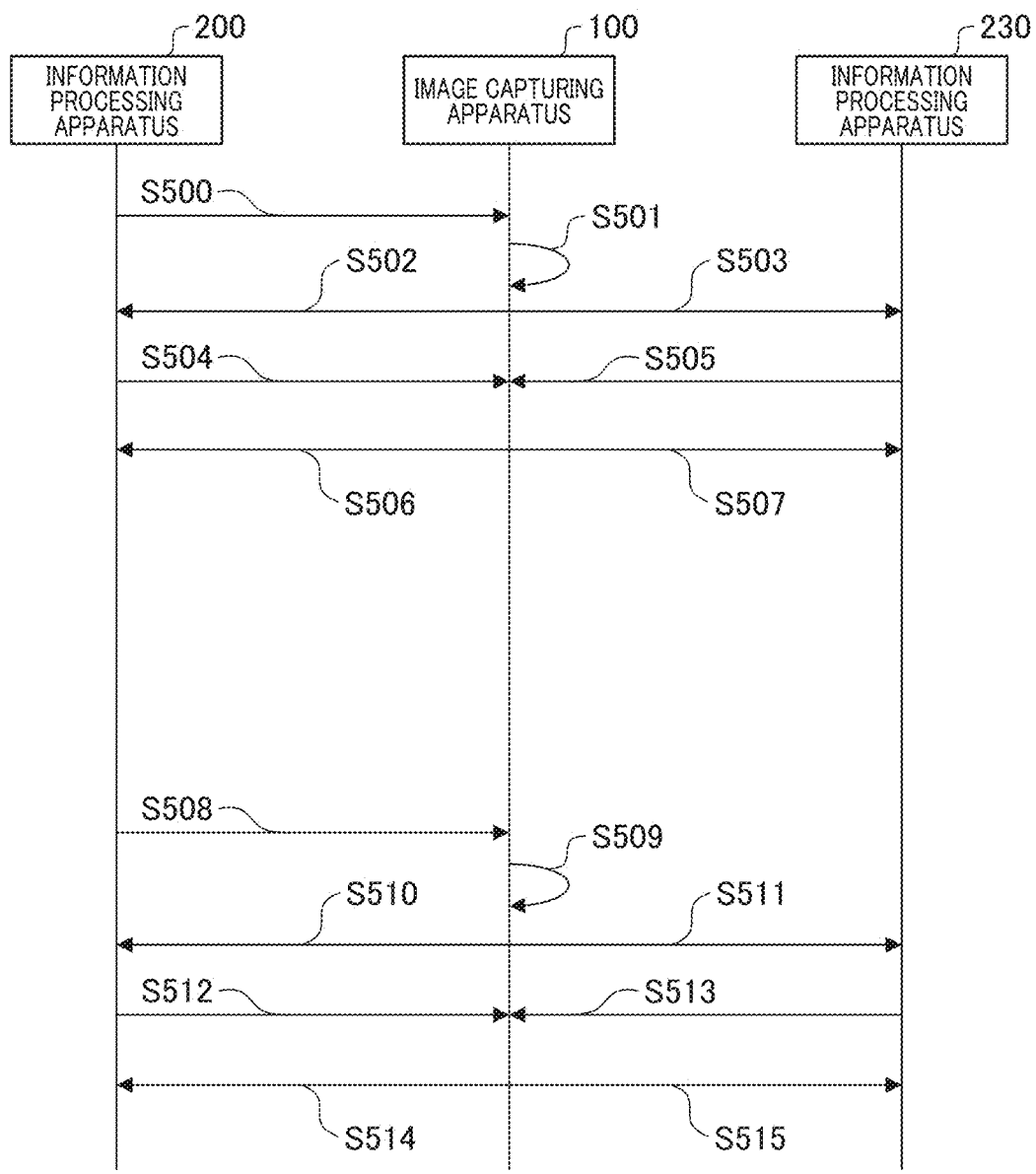
FIG. 5 is a diagram illustrating an example of an operation sequence of the image capturing apparatus and the information processing apparatus according to the embodiment.
Figure 6:
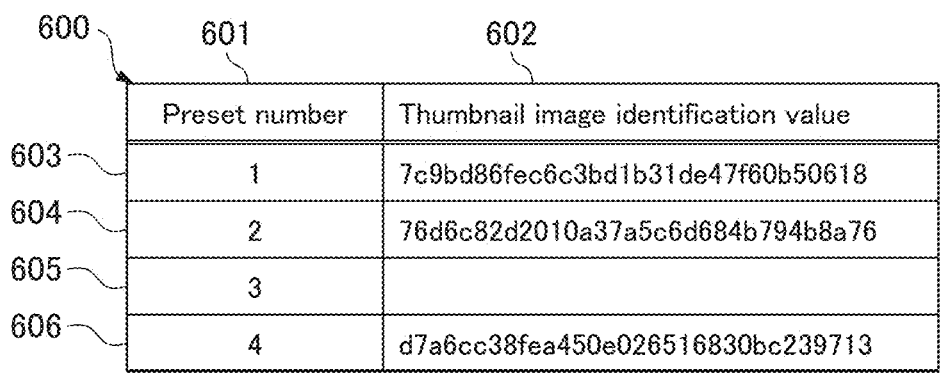
FIG. 6 is a table showing the correspondence between a preset number and an identification value of an thumbnail image according to the embodiment.

FIG. 5 illustrates an example of sequence diagram indicating a preset registration request and a thumbnail acquisition request transmitted between the image capturing apparatus 100 and the information processing apparatus 200 and the information processing apparatus 230, and responses to the requests. FIG. 6 is a diagram of an example of a table representing the correspondence between preset numbers and identification values (identification information) of thumbnail images. Additionally, each of the processes (operations) below can be realized by the CPU 400 of the image capturing apparatus 100, the information processing apparatus 200, and the information processing apparatus 200 executing a program stored in a memory, for example, the RAM 410, the ROM 420, or the HDD 430. Additionally, the notation of the process (step) will be omitted by adding S to the head of each process (step).

First, it is assumed that, in S500, the user operates the operation receiving unit 202 of the information processing apparatus 200 to register the current image capturing state (the current position of the image capturing apparatus 100) in preset number 1. Then, the system control unit 203 receives a preset registration instruction for the preset number 1 via the operation receiving unit 202. Subsequently, the system control unit 203 transmits the preset registration request for the preset number 1 to the image capturing apparatus 100 via the communication unit 204. Additionally, the image capturing apparatus 100 is requested to register the thumbnail image at the same time.

Next, in S501, when the image capturing apparatus 100 receives the preset registration request, the system control unit 113 acquires an image captured by the image capturing unit 111 via the image processing unit 112, and generates a thumbnail image obtained by reducing the image. That is, the system control unit 113 generates the thumbnail image based on the image captured at the image capturing position (image capturing direction) in the image capturing apparatus 100 registered in the preset number 1. Note that the image capturing apparatus 100 receives the preset registration request for the preset number 1 via the network 300 and the communication unit 116.

Thus, the preset function means that information indicating an image capturing direction (image capturing position) in which the image capturing apparatus 100 performs image capturing is registered as preset information. Then, when the preset is specified by the user, the image capturing direction of the image capturing apparatus 100 is changed so that the image capturing position indicated by the preset information is imaged. The information indicating the image capturing direction in the preset in each preset registration is indicated by, for example, two dimensional coordinates indicating a coordinate in the pan direction and a coordinate in the tilt direction. As an example, the coordinate information, the preset number, and the thumbnail image are associated with each other, and the three are registered (stored) as the preset information. In addition to the information indicating the pan direction and the tilt direction, information indicating a current zoom value (magnification ratio) may also be added as the preset information. That is, information indicating the state of PTZ (pan, tilt, and zoom) may be included in the preset information.

Additionally, the thumbnail image of the preset is not necessarily an image captured when the preset is registered. The image may be at least an image corresponding to the preset information. For example, a map image, an icon image, and the like indicating the image capturing direction indicated by the preset information may be used.

Additionally, in parallel with or in conjunction with the generation of the thumbnail image, the system control unit 113 acquires information such as the image quality parameter and the current position of the PTZ via the image processing unit 112 and the PTZ control unit 114. The acquired information is stored in the storage unit 115 as preset information together with the preset number. When the thumbnail image is generated, the system control unit 113 generates (calculates) a hash value, which is used as an identification value of the thumbnail image, and stores the hash value as a setting value in the storage unit 115 in association with the preset number. The system control unit 113 also stores the thumbnail image in the storage unit 115 in association with the preset number. Specifically, the system control unit 113 stores the hash value, which is used as the identification value of the thumbnail image, and the thumbnail image in the storage unit 115 in association with the preset number. Thus, the system control unit 113 generates an identification value for uniquely identifying a thumbnail image.

Here, the correspondence between the preset number and the thumbnail image identification value stored in the storage unit 115 will be explained with reference to FIG. 6. A table 600 shows the correspondence between a preset number 601 and the hash value of the thumbnail image, which is used as a thumbnail image identification value 602. In the table 600, since, in preset numbers 1, 2, and 4, hash values are registered, thumbnail images are stored. However, since, in the preset number 3, the hash value of is null, it is found that no thumbnail image is stored. Note that, in the present embodiment, the hash value of the image data is used as the thumbnail image identification value 602. However, the present invention is not limited thereto, and another value may be used if it is information that can uniquely specify (identify) a thumbnail image, for example, date and time information of the timing at which the thumbnail image was generated, a PTZ value during preset registration, or a combination thereof. In S501, the generated hash value is stored in the region of a thumbnail identification value 603 corresponding to 1 of the preset number 601.

Next, in S502, the system control unit 113 provides a notification regarding a hash value indicating that the thumbnail of preset number 1 has been registered, together with the information indicating that the preset of preset number 1 has been registered, to the information processing apparatus 200. Thus, the system control unit 113 provides a notification about the hash value that is a thumbnail image identification value to the information processing apparatus 200, which is external to the image capturing apparatus 100. Note that the image capturing apparatus 100 provides the notification to the information processing apparatus 200 via the communication unit 116 and the network 300.

Next, in S503, the system control unit 113 provides a notification about a hash value indicating that the thumbnail of preset number 1 has been registered, together with the information indicating that the preset of preset number 1 has been registered, to the information processing apparatus 230. Thus, the system control unit 113 provides a notification about the hash value, which is a thumbnail image identification value, to the information processing apparatus 230, which is external to the image capturing apparatus 100. Note that the image capturing apparatus 100 provides the above notification to the information processing apparatus 230 via the communication unit 116 and the network 300. Here, S502 and the S503 are preferably executed in parallel or in conjunction with each other, as shown in FIG. 5. Note that the process order of S502 and S503 may be reversed.

Next, in S504, when the information processing apparatus 200 receives the hash value of the thumbnail image, the system control unit 203 issues a thumbnail image acquisition request for the preset number 1 to the image capturing device 100 via the communication unit 204 and the network 300. Note that the information processing apparatus 200 receives the hash value of the thumbnail image via the network 300 and the communication unit 204.

Next, in S505, when the information processing apparatus 230 receives the hash value of the thumbnail image, the system control unit 233 issues a thumbnail image acquisition request for the preset number 1 to the image capturing apparatus 100 via the communication unit 234 and the network 300. Note that the information processing apparatus 230 receives the hash value of the thumbnail image via the network 300 and the communication unit 234. Here, S504 and the S505 are preferably executed in parallel or in conjunction with each other, as shown in FIG. 5. Note that the process order of S504 and S505 may be reversed.

Next, in S506, when the image capturing apparatus 100 receives the thumbnail image acquisition request from the information processing apparatus 200 via the communication unit 116, the system control unit 113 acquires the thumbnail image of the preset number 1 stored in the storage unit 115. Then, the system control unit 113 transmits the thumbnail image to the information processing apparatus 200 via the communication unit 116 and the network 300. Upon receiving the thumbnail image of the preset number 1 via the communication unit 204, the system control unit 203 of the information processing apparatus 200 instructs the display control unit 201 to redisplay the thumbnail image. Then, the display control unit 201 displays the thumbnail image on the display 220 based on the instruction from the system control unit 203. Thus, the thumbnail image of the preset number 1 stored in the storage unit 115 can be displayed on the display 220.

Next, in S507, when the image capturing apparatus 100 receives the thumbnail image acquisition request from the information processing apparatus 230 via the communication unit 116, the system control unit 113 acquires the thumbnail image of the preset number 1 stored in the storage unit 115. Then, the system control unit 113 transmits the thumbnail image to the information processing apparatus 230 via the communication unit 116 and the network 300. Upon receiving the thumbnail image of the preset number 1 via the communication unit 234, the system control unit 233 of the information processing apparatus 230 instructs the display control unit 231 to redisplay the thumbnail image. Then, the display control unit 231 displays the thumbnail image on the display 240 based on the instruction from the system control unit 233. Thus, the thumbnail image of the preset number 1 stored in the storage unit 115 can be displayed on the display 240. Here, S506 and the S507 are preferably executed in parallel or in conjunction with each other, as shown in FIG. 5. Note that the process order of S506 and S507 may be reversed.

Next, in S508, it is assumed that the user operates the operation receiving unit 202 of the information processing apparatus 200 to re-register the current image capturing state (the current position of the image capturing apparatus 100) in the preset number 1. Then, the system control unit 203 receives a preset registration instruction for the preset number 1 via the operation receiving unit 202. Subsequently, the system control unit 203 transmits the preset registration request for the preset number 1 to the image capturing apparatus 100 via the communication unit 204. Additionally, the image capturing apparatus 100 is requested to register the thumbnail image at the same time.

Next, in S509, when the image capturing apparatus 100 receives the preset registration request, the system control unit 113 acquires an image captured by the image capturing unit 111 via the image processing unit 112, and generates a thumbnail image obtained by reducing the image. Note that the image capturing apparatus 100 receives the preset registration request via the network 300 and the communication unit 116.

In parallel with or in conjunction with the generation of the thumbnail image, the system control unit 113 acquires information such as an image quality parameter and the current position of the PTZ via the image processing unit 112 and the PTZ control unit 114. Then, each acquired information is stored in the storage unit 115 as preset information together with the preset number. When the thumbnail image is generated, the system control unit 113 generates (calculates) a hash value, which is used as an identification value of the thumbnail image, and stores the hash value as a setting value in the storage unit 115 in association with the preset number. Here, the value of the thumbnail image identification value 602 of the preset number 1 in the table 600 is updated and stored.

Next, in S510, the system control unit 113 provides a notification about the hash value indicating that the thumbnail of preset number 1 has been updated to the information processing apparatus 200, together with the information indicating that the preset of preset number 1 has been re-registered. Thus, the system control unit 113 provides a notification about the hash value that is a thumbnail image identification value to the information processing apparatus 200, which is external to the image capturing apparatus 100. Note that the image capturing apparatus 100 provides the above notification to the information processing apparatus 200 via the communication unit 116 and the network 300.

Next, in S511, the system control unit 113 provides a notification about the hash value indicating that the thumbnail of preset number 1 has been updated to the information processing apparatus 230, together with the information indicating that the preset of preset number 1 has been re-registered. Thus, the system control unit 113 provides a notification about the hash value, which is used as the thumbnail image identification value, to the information processing apparatus 230, which is external to the image capturing apparatus 100. Note that the image capturing apparatus 100 provides the above notification to the information processing apparatus 230 via the communication unit 116 and the network 300. Here, S510 and the S511 are preferably executed in parallel or in conjunction with each other, as shown in FIG. 5. Note that the process order of S510 and S511 may be reversed.

Next, in S512, when the information processing apparatus 200 receives the hash value of the thumbnail image, the system control unit 203 issues a thumbnail image acquisition request for the preset number 1 to the image capturing apparatus 100 via the communication unit 204 and the network 300. Note that the information processing apparatus 200 receives the hash value of the thumbnail image via the network 300 and the communication unit 204.

Next, in S513, when the information processing apparatus 230 receives the hash value of the thumbnail image, the system control unit 233 issues a thumbnail image acquisition request for the preset number 1 to the image apparatus 100 via the communication unit 204 and the network 300. Note that the information processing apparatus 230 receives the hash value of the thumbnail image via the network 300 and the communication unit 234. Here, S512 and the S513 are preferably executed in parallel or in conjunction with each other, as shown in FIG. 5. Note that the process order of S512 and S513 may be reversed.

Next, in S514, when the image capturing apparatus 100 receives the thumbnail image acquisition request from the information processing apparatus 200 via the communication unit 116, the system control unit 113 acquires the thumbnail image of the preset number 1 stored in the storage unit 115. Then, the system control unit 113 transmits the thumbnail image to the information processing apparatus 200 via the communication unit 116 and the network 300. Upon receiving the thumbnail image of the preset number 1 via the communication unit 204, the system control unit 203 of the information processing apparatus 200 instructs the display control unit 201 to redisplay the thumbnail image. Then, the display control unit 201 displays the thumbnail image on the display 220 based on the instruction from the system control unit 203. Thus, the thumbnail image of the preset number 1 stored in the storage unit 115 can be displayed on the display 220.

Next, in S515, when the image capturing apparatus 100 receives the thumbnail image acquisition request from the information processing apparatus 230 via the communication unit 116, the system control unit 113 acquires the thumbnail image of the preset number 1 stored in the storage unit 115. Then, the system control unit 113 transmits the thumbnail image to the information processing apparatus 230 via the communication unit 116 and the network 300. Upon receiving the thumbnail image of the preset number 1 via the communication unit 234, the system control unit 233 of the information processing apparatus 230 instructs the display control unit 231 to redisplay the thumbnail image. Then, the display control unit 231 displays the thumbnail image on the display 240 based on the instruction from the system control unit 233. Thereby, the thumbnail image of the preset number 1 stored in the storage unit 115 can be displayed on the display 240. Here, S514 and the S515 are preferably executed in parallel or in conjunction with each other, as shown in FIG. 5. Note that the process order of S514 and S515 may be reversed.

Here, if information indicating whether or not the thumbnail image is stored is simply used as the information of the thumbnail image, the change notification cannot be transmitted in S510 and S511 when the thumbnail image is overwritten and saved. Therefore, since the information processing apparatus cannot acquire the thumbnail image from the image capturing apparatus at the timing of updating the thumbnail image, redisplay of the thumbnail image on the display at an appropriate timing is impossible.

However, according to the image capturing apparatus 100 of the present embodiment, it is possible to transmit the change notification about the thumbnail image to the target information processing apparatus in S510 and S511 at the timing when the thumbnail image is updated by using the hash value of the image as the information of the thumbnail image. Since the information processing apparatus that has received the change notification can acquire the thumbnail image from the image capturing apparatus by using the change notification as a trigger, the thumbnail image can be redisplayed on the display without causing a time lag from the update of the thumbnail image.

Figure 7:
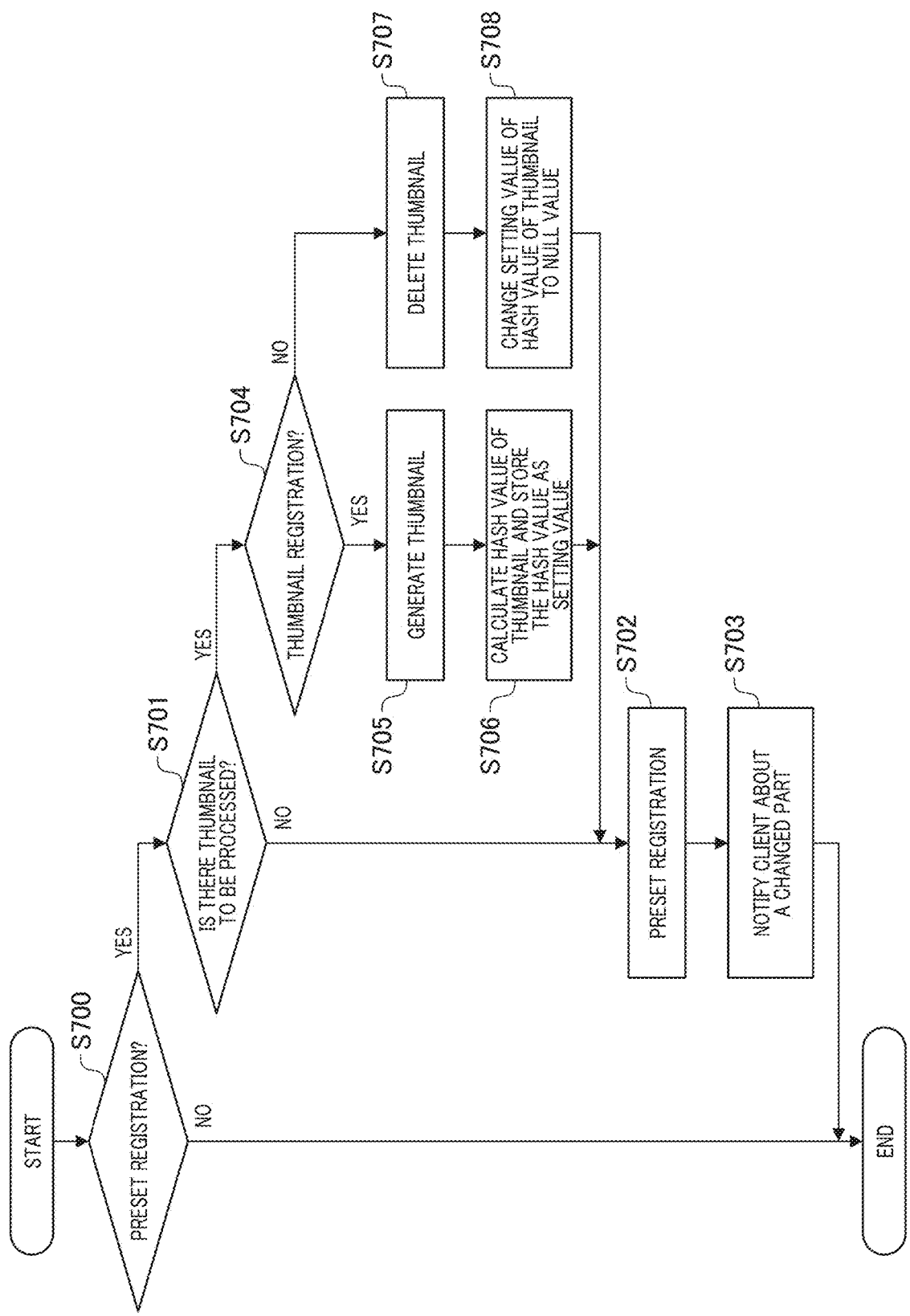
FIG. 7 is a flowchart illustrating an example of a control method of the image capturing apparatus according to the embodiment.

Next, a control method performed by the system control unit 113 of the image capturing apparatus 100 of the present embodiment will be explained in more detail below with reference to the flowchart of FIG. 7. FIG. 7 is a flowchart illustrating an example of a control method of the image capturing apparatus 100 according to the present embodiment. Each process (operation) below is realized by the system control unit 113 (CPU 400) of the image capturing apparatus 100 deploying a program stored in the ROM 420 into the RAM 410 (storage unit 115) and executing the program. Additionally, the notation of the process (step) will be omitted by adding S to the head of each process (step). Additionally, the processes according to the flowchart of FIG. 7 start when the image capturing apparatus 100 receives a preset registration request from the information processing apparatus 200.

First, in S700, the system control unit 113 determines whether or not the request received via the communication unit 116 is a preset registration request. As a result of the determination, if the received request is not a preset registration request, the processing of this flowchart ends. In contrast, if the received request is a preset registration request, the process proceeds to S701.

Next, in S701, the system control unit 113 determines whether or not a command for thumbnail registration or thumbnail deletion is included in the preset registration request that has been received in S700. If it is determined that a thumbnail registration command or a thumbnail deletion command is not included in the preset registration request, the process proceeds to S702. In contrast, if a thumbnail registration command or a thumbnail deletion command is included in the preset registration request, the process proceeds to S704.

Next, in S702, the system control unit 113 acquires information such as the image quality parameters and the current position of the PTZ (the position of the image capturing apparatus 100) via the image processing unit 112 and the PTZ control unit 114, and stores the information as preset information in the storage unit 115 together with the preset number.

Next, in S703, the system control unit 113 provides a notification about the information indicating that a preset has been registered to the information processing apparatus 200 and the information processing apparatus 230 via the communication unit 116 and the network 300.

Next, in S704, the system control unit 113 determines whether or not a command related to the thumbnail that is included in the preset registration request that has been received in S700 is thumbnail registration. If it is determined that the command related to the thumbnail included in the preset registration request is the thumbnail registration, the process proceeds to S705. In contrast, when the command related to the thumbnail included in the preset registration request is not the thumbnail registration, the process proceeds to S707. Here, in a case where the command related to the thumbnail is the thumbnail deletion, the system control unit 113 determines that the command related to the thumbnail included in the received preset registration request is not the thumbnail registration.

Next, in S705, the system control unit 113 acquires the image captured by the image capturing unit 111 via the image processing unit 112 and generates a thumbnail image obtained by reducing the image. Specifically, the system control unit 113 generates a thumbnail image based on the image registered in the specified preset number (predetermined preset number) included in the preset registration request.

Next, in S706, when the thumbnail image is generated, the system control unit 113 generates (calculates) a hash value, which is used as the identification value of the thumbnail image, and stores the hash value as a setting value in the storage unit 115 in association with the generated hash value and the preset number. The system control unit 113 also stores the thumbnail image in the storage unit 115 in association with the preset number. That is, the system control unit 113 stores the preset number, the hash value, and the thumbnail image in association with each other in the storage unit 115. Subsequently, the process proceeds to S702 and S703, the similar processes are performed, and the processes of this flowchart end.

Next, in S707, the system control unit 113 deletes the thumbnail image of the preset number specified by the command related to the thumbnail included in the preset registration request from the storage unit 115.

Next, in S708, the system control unit 113 deletes the hash value of the thumbnail image associated with the preset number specified by the command related to the thumbnail included in the preset registration request from the storage unit 115, and sets the identification value to a null value. Subsequently, the process proceeds to S702 and S703, similar processes are performed, and the processes of this flowchart end. Note that, in a case where the process proceeds from S708 to S702 and S703, the system control unit 113 may notify the information processing apparatus that the identification value associated with the thumbnail image of the preset number specified by the command related to the thumbnail is a null value. Additionally, in this case, the system control unit 113 may notify the information processing apparatus that the thumbnail image of the preset number specified by the command related to the above thumbnail has been deleted and that the identification value associated with that thumbnail image is a null value.

Although, in FIG. 7, an example of the processing performed by the image capturing apparatus 100 and the information processing apparatus 200 is illustrated, the similar processing can be performed by the information processing apparatus 230.

As described above, according to the image capturing system including the image capturing apparatus 100 of the present embodiment, it is possible to immediately provide a notification about the camera information including an identification value to each information processing apparatus promptly, for example, when a thumbnail image is re-registered or deleted. Specifically, even in the case where a thumbnail image is overwritten and saved to a preset for which a thumbnail image has already been stored, an external apparatus, for example, an information processing apparatus can be notified about this. Therefore, each information processing apparatus can redisplay the corresponding thumbnail image at an appropriate timing.

Additionally, according to the embodiment as described above, the system control unit 113 generates a thumbnail image based on a captured image imaged by the image capturing apparatus 100. However, the present invention is not limited thereto, and the system control unit 113 may generate a thumbnail image based on an arbitrary image that is different from the captured image, or by resizing an arbitrary image.

Additionally, according to the embodiment as described above, the thumbnail image is associated with the preset number. However, the similar processing may be performed on a thumbnail image that is not associated with the preset number. For example, the present embodiment can be applied at an arbitrary timing such as a case where a thumbnail image is appropriately generated in a tracing function of storing a track of a specific PTZ position. The tracing function is a function in which the user changes the image capturing direction of the image capturing apparatus for a predetermined time, and the tracking of the change in the image capturing direction at that time is stored. When the user specifies the track information thereof, the image capturing direction can be changed similarly according to the track information thereof.

Additionally, according to the embodiment as described above, each information processing apparatus is notified about the thumbnail image identification value 602, which is a change notification from the previous time. However, the present invention is not limited thereto, and the thumbnail image identification value, which is a part of the camera information currently held by the image capturing apparatus 100, may be notified in response to a request from each information processing apparatus. Specifically, the hash value of the thumbnail image identification value 602 is included in the camera information currently held by the image capturing apparatus 100, and the system control unit 113 provides notification about the camera information including the hash value to each information processing apparatus in response to a request from each information processing apparatus. Notification may be provided only about the hash value as camera information. In other words, notification may be provided about the hash value that is the thumbnail image identification value 602 as camera information to each information processing apparatus in response to a request from each information processing apparatus.

Additionally, information on the hash value may be included as metadata in association with the thumbnail image. Thus, the image capturing apparatus or the information processing apparatus can compare the notified hash value and the hash value of the acquired thumbnail image at a high speed.

The present invention can also be realized by processing in which a program for realizing one or more functions of the above-described embodiment is supplied to a system or an apparatus via a network or a storage medium, and one or more processors in a computer of the system or the apparatus read out and execute the program. Additionally, the present invention can also be realized by a circuit (for example, ASIC) that realizes one or more functions.

Although the preferred embodiment of the present invention has been described in detail, the present invention is not limited to the specific embodiment, and various modifications and changes can be made within the scope of the gist of the present invention recited in the claims.

Additionally, the functions of the above-described embodiment is not only realized by executing the program code read out by the computer. An operating system (OS) and the like running on the computer may perform part or all of the actual processing based on the instructions of the program code.

Furthermore, a case where the functions of the above-described embodiment are realized by the method below is also included. The program codes read out from the recording medium are written in a memory provided in a function extension card inserted into the computer or a functional expansion unit connected to the computer. Subsequently, the CPU of the functional extension card or the functional expansion unit performs part or all of the actual processing based on the instructions of the program code.

In a case where the present invention is applied to the recording medium, program codes corresponding to each flowchart as explained above are stored in the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-140290, Aug. 30, 2023, which is hereby incorporated by reference wherein in its entirety.

What is claimed is:
1. An image capturing apparatus comprising:
one or more memories storing instructions; and
one or more processors executing the instructions to:
provide a notification about first information to an information processing apparatus external to the image capturing apparatus, in response to a change in the first information generated by the image capturing apparatus;
register information indicating an image capturing direction of the image capturing apparatus;
generate a thumbnail image based on a captured image captured by an image capturing unit included in the image capturing apparatus in the registered image capturing direction;
generate identification information that uniquely identifies the generated thumbnail image; and provide a notification about the generated identification information as the first information to the information processing apparatus.

2. The image capturing apparatus according to claim 1, wherein the identification information is a hash value of the thumbnail image.

3. The image capturing apparatus according to claim 1, wherein the identification information is information on date and time during generation of the thumbnail image.

4. The image capturing apparatus according to claim 3, wherein the one or more processors stores each of the thumbnail image and the identification information in a storage unit in association with a preset number.

5. The image capturing apparatus according to claim 4, wherein the one or more processors determines whether or not a command included in a request transmitted from the information processing apparatus is related to thumbnail registration.

6. The image capturing apparatus according to claim 5, wherein in a case where it is determined by the determination that the command is related to thumbnail registration, the one or more processors generates a thumbnail image, and
wherein in a case where it is determined by the determination that the command is not related to thumbnail registration, one or more processors deletes a thumbnail image with a preset number specified by the command from the storage unit.

7. The image capturing apparatus according to claim 6, wherein, in a case where the thumbnail image is deleted from the storage unit, the one or more processors sets the identification information associated with the thumbnail image to be deleted to a null value.

8. The image capturing apparatus according to claim 7, wherein the one or more processors provides a notification to the information processing apparatus that the identification information associated with the thumbnail image is a null value.

9. The image capturing apparatus according to claim 1, wherein the one or more processors generates the thumbnail image based on the captured image after receiving a request related to preset registration from the information processing apparatus.

10. The image capturing apparatus according to claim 1, wherein the one or more processors generates the thumbnail image based on an arbitrary image different from the captured image or by resizing the arbitrary image.

11. The image capturing apparatus according to claim 1, wherein the thumbnail image includes at least a hash value as metadata.

12. The image capturing apparatus according to claim 1, wherein the one or more processors generates the thumbnail image at an arbitrary timing.

13. The image capturing apparatus according to claim 1, wherein the one or more processors causes the thumbnail image to be displayed on a display device.

14. The image capturing apparatus according to claim 1, wherein the first information includes at least one of information indicating a current state of the image capturing apparatus, control information of the image capturing apparatus, and information on a setting value of the image capturing apparatus.

15. A control method of an image capturing apparatus having an image capturing unit comprising:
providing a notification about first information to an information processing apparatus external to the image capturing apparatus, in response to a change in the first information generated by the image capturing apparatus;
registering information indicating an image capturing direction of the image capturing apparatus;
generating a thumbnail image based on an image captured by the image capturing unit in the registered image capturing direction;
generating identification information that uniquely identifies the generated thumbnail image; and
providing a notification about the generated identification information as the first information to the information processing apparatus.

16. A non-transitory computer-readable storage medium configured to store a computer program comprising instructions for executing following processes:
providing a notification about first information to an information processing apparatus external to an image capturing apparatus in response to a change in the first information generated by the image capturing apparatus;
registering information indicating an image capturing direction of the image capturing apparatus;
generating a thumbnail image based on an image captured by an image capturing unit included in the image capturing apparatus in the registered image capturing direction;
generating identification information that uniquely identifies the generated thumbnail image; and
providing a notification about the generated identification information as the first information to the information processing apparatus.

17. An image capturing system including an image capturing apparatus and at least one information processing apparatus communicably connected to the image capturing apparatus,
the image capturing apparatus comprising:
one or more memories storing instructions; and
one or more processors executing the instructions to:
provide a notification about first information to the information processing apparatus, in response to a change in the first information generated by the image capturing apparatus;
register information indicating an image capturing direction of the image capturing apparatus;
generate a thumbnail image based on an image captured by an image capturing unit included in the image capturing apparatus in the registered image capturing direction;
generate identification information that uniquely identifies the generated thumbnail image; and
provide a notification about the identification information as the first information to the information processing apparatus,
the information processing apparatus comprising:
one or more memories storing instructions; and
one or more processors executing the instructions to:
receive an operation of registering information indicating the image capturing direction;
cause the thumbnail image to be displayed; and
request the image capturing apparatus to register the thumbnail image.

* * * * *